Hubbard & Conant.
Valve Motion.
No. 3,885. Reissued Mar. 22, 1870.
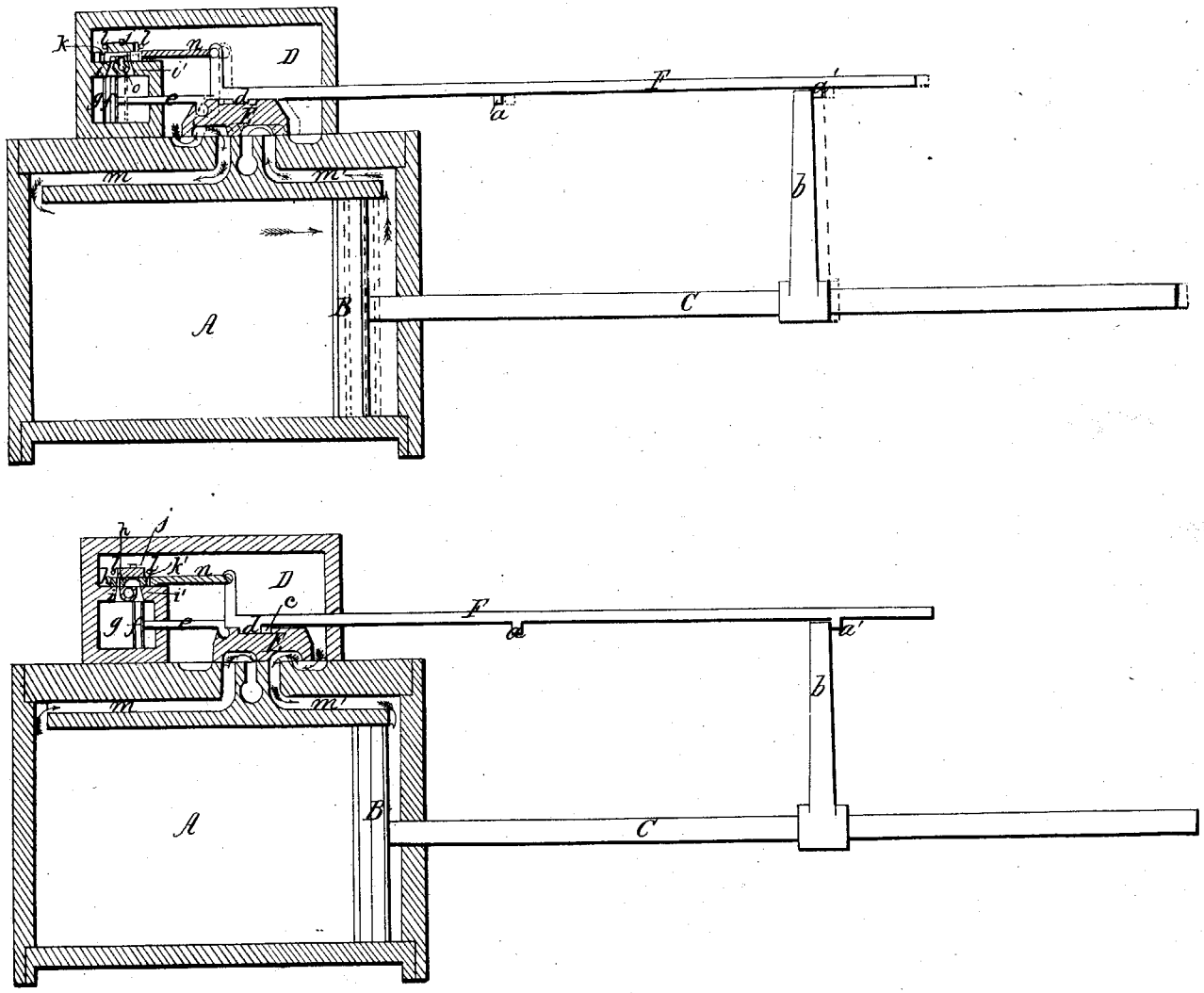
N. PETERS, PHOTO-LITHOGRAPHER, WASHINGTON, D. C.

UNITED STATES PATENT OFFICE.

WILLIAM H. GUILD AND WILLIAM F. GARRISON, OF BROOKLYN, E. D., NEW YORK, ASSIGNEES OF GEORGE W. HUBBARD AND WILLIAM E. CONANT.

IMPROVEMENT IN OPERATING SLIDE-VALVES IN DIRECT-ACTING ENGINES.

Specification forming part of Letters Patent No. 12,203, dated January 9, 1855; reissue No. 2,359, dated September 18, 1866; extended seven years; reissue No. 3,885, dated March 22, 1870.

*To all whom it may concern:*

Be it known that we, GEORGE W. HUBBARD, of Brooklyn, in the county of Kings and State of New York, and WILLIAM E. CONANT, of Green Point, in the county and State aforesaid, have invented certain new and useful Improvements in Mechanism for Operating the Valves of Direct-Acting Steam-Engines; and that the following is a full and correct description thereof, reference being had to the accompanying drawings and to the letters of reference thereon.

Our invention relates to the use of double-acting supplemental and valve-working engines in combination with the valves of a double-acting main engine, which is an engine whose power is transmitted directly from the piston to the work without the intervention of a crank, and therefore cannot have its valves worked by any of the ordinary valve-motions.

Before our invention the valves of double-acting engines having cranks or revolving shafts, or both, had been worked in a great variety of ways. Our invention, however, does not apply to such engines, but only to that class of double-acting engines in which no crank and no rotating shaft are employed.

Before our invention the single-acting valve of a single-acting steam-hammer engine had been worked by a single-acting piston, the main engine being applied to lifting a forge-hammer, which descended by gravity; but in this case the valve-working piston was always pressed in one direction by the force of the steam, and thrown back against the pressure of the steam by the force of the main piston acting through a lever.

In another case, in the English patent to Nasmith & Gaskell, No. 12,074, A. D. 1848, the valve of a single-acting engine used to lift a hammer is described as being worked by a double-acting supplemental engine, whose valve was worked by a piston, supplied with steam alternately from the valve-chest and cylinder of the main engine; but this combination was not operative unless in a single-acting main engine, arranged and combined in the manner described.

A locomotive is said to have been constructed consisting of two main engines connected to the crank-shaft, and in which the valve of each engine was operated by a connection from the piston of the other; but the engines of this locomotive could not have operated unless the crank-shaft was used, and the plan was simply a substitute for eccentrics and rods.

Our invention has improved the double-acting engine which employs neither crank nor fly-wheel, first, by combining with a double-acting main engine and its steam-valve a supplemental steam-piston and valve, to admit steam alternately on both sides of the supplemental piston; second, by combining the piston of the main engine with the valve of the supplemental engine by means of a tappet-connection, so as to move the supplemental valve; third, by combining the main valve of a double-acting engine both with a supplemental piston and the main piston, so that the main valve derives part of its motion from each piston, substantially as hereinafter described; fourth, by combining together a double-acting main engine, a supplemental piston and valve, and the main valve, in such manner, substantially as herein described, that the main valve is started by the main piston, and its motion completed by the supplemental piston; also, by arranging the supplemental valve and piston within the steam-chest of the main engine, whereby the supplemental valve and piston are protected and a compact construction obtained.

The drawings represent the form of construction we prefer.

Figures 1 and 2 represent two longitudinal sections, showing the position of the parts at different stages of the operation of the engine.

A is the cylinder of the main engine; B, its piston; C, its piston-rod; D, its steam-chest; E, the valve of the main engine; F, the valve-stem; *a a'*, the tappets on the valve-stem; and *b*, the tappet-arm on the piston-rod.

All the parts are of the usual construction; but we prefer to give more play than usual to the valve with relation to its stem.

The main valve is connected with the piston-rod *e* of a supplemental piston, *f*, working in a very small steam-cylinder, *g*, which is contained within the steam-chest D. This cylinder is packed closely at each end, and has two ports, *i i*, above or on either side, for admitting steam to it from the steam-chest, and an exhaust-port, *o*, for exhausting it, such admission and exhaustion of steam being controlled by a supplemental valve, *h*, working over said ports, and having two passages, *k k*, made in it for the admission of steam to the ports *i i'*. The supplemental valve *h* is connected by a rod, *n*, with the stem F of the main valve. A plate, *j*, rests upon the supplemental valve, forming a part of its mechanism, and has a movement, the length of which is determined by two fixed stops, *l l*, the motion allowed it being equal to half the length of stroke of the main slide-valve E, minus the length of the ports in the supplemental cylinder and valve. The amount of play allowed to the hook *d* of the main valve-stem F in the recess *c* in the main valve E is equal to the aforesaid length of movement allowed to the plate *j*.

To describe the manner in which the main valve E is operated, we will first suppose the steam-port *m* of the main engine to be open, and the main piston B to have so nearly finished its stroke to the right that the tappet-arm *b* is just coming in contact with the tappet *a'* to start the main valve. At this time the ports *i i'* of the supplemental cylinder are closed. After the tappet is struck, the piston B will continue its motion beyond the above-mentioned point until it brings the main valve E to a central position over its ports, as shown in red outline in Fig. 1, when, both steam-ports being closed, the motion of the piston ceases, and the motion of the main valve E would also cease, but that, in moving from the black to the red positions aforesaid, the valve-stem F moves the supplemental valve *h*, which opens the port *i* to admit steam to the supplemental cylinder *g*, to act on the supplemental piston *f*, so that the latter, by its motion, shall complete the stroke of the main valve E, thus opening the port *m'* to reverse the motion of the main piston. During the greater portion of that part of the movement of the main valve E produced by the supplemental piston *f*, the main valve-stem F and supplemental valve-stem *n* are stationary, as the hook or projection *d* on the main valve-stem is moving from end to end of the recess *c*; but just before the stroke of the main valve is completed, the end of the recess comes in contact with the said projection or hook, and the remainder of the stroke causes the supplemental valve *h* to be moved far enough for its passage *k* to be closed by the sliding plate *j*; then the movement of the main valve E ceases. The ports *i i* of the supplemental cylinder *g* remain closed and the main valve E stationary, and all the valve-gear in the condition represented in Fig. 2, until the main piston, in its movement to the left, brings the tappet-arm in contact with the tappet *a*, when the main valve E is operated upon in a manner in every way precisely the reverse of that hereinabove described, which will be readily understood, steam being admitted to act alternately upon both sides, not only of the main piston, but also of the supplemental piston at each full stroke of the main engine, which, as well as the supplemental engine, is double-acting. The ports *i i'* are made of such width where they enter the cylinder *g*, and are in such position, that the supplemental piston *f*, at the instant one of the ports is closed, just passes the edge of the opposite port to that through which the steam has been entering, and so allows the steam in the cylinder to exhaust. This is illustrated best in Fig. 2, where the supplemental port *i* is supposed to be just closed, and the steam, which has just acted on the piston, is exhausting through it. The opening from the supplemental cylinder *g* into the latter port, though necessarily very small, is wide enough, as nearly the whole time occupied by the movement of the main piston is allowed for the exhaustion of the supplemental cylinder.

We claim as of our invention and improvement in double-acting steam-engines which employ neither crank nor fly-wheel, but in which the power of the piston is applied directly to the work—

1. In combination with a double-acting main engine and its valves, and a supplemental piston acting to move this main valve so as to admit steam alternately upon opposite sides of the main piston, a supplemental valve, whose office is to admit steam alternately upon opposite sides of the supplemental piston, the combination being substantially such as hereinbefore described.

2. In combination with the elements specified in the first clause of this claim, a tappet-connection from the main piston to a supplemental valve, whereby the supplemental valve is moved to admit steam alternately upon opposite sides of the supplemental piston, substantially as described.

3. The combination of the main valve of a double-acting engine, both a supplemental piston and the main piston, so that the main valve derives a part of its motion from each piston, the combination being substantially such as herein set forth.

4. The combination of a double-acting main engine, a supplemental piston and valve, and the main valve, in such manner, substantially as described, by means of a tappet-connection, that the main valve is started by its own piston, and its stroke completed by a force dependent upon the movement of the supplemental valve by the main piston, the combination being substantially as described.

5. The arrangement of a supplemental piston within the valve-chest of the main engine, substantially as described, when said piston is connected with the main valve, substantially as described.

6. The arrangement of the supplemental valve and the main valve within the same chest, substantially as described.

GEO. W. HUBBARD.
WM. E. CONANT.

Witnesses:
JOS. B. LAWRENCE,
GEORGE W. BISSLAND,
J. T. WILLIAMS,
WM. B. KRUG.